United States Patent [19]
Pfeiffer

[11] Patent Number: 5,544,192
[45] Date of Patent: Aug. 6, 1996

[54] OPTICALLY PUMPED BISTABLE LASER

[75] Inventor: Thomas Pfeiffer, Stuttgart, Germany

[73] Assignee: Alcatel N.V., Rijswijk, Netherlands

[21] Appl. No.: 405,539

[22] Filed: Mar. 16, 1995

[30] Foreign Application Priority Data

Mar. 19, 1994 [DE] Germany ............... 44 09 444.2

[51] Int. Cl.⁶ .................................................. H01S 3/09
[52] U.S. Cl. ................... 372/69; 372/703; 372/6; 372/23; 372/94
[58] Field of Search ........................... 372/69, 70, 23, 372/94, 703, 6

[56] References Cited

U.S. PATENT DOCUMENTS

| | | | |
|---|---|---|---|
| 5,367,587 | 11/1994 | Mizuochi et al. | 372/6 |
| 5,426,656 | 6/1995 | Tohmon et al. | 372/69 |
| 5,430,824 | 7/1995 | Chigusa et al. | 372/6 |

FOREIGN PATENT DOCUMENTS 4317667  12/1994  Germany .

OTHER PUBLICATIONS

"Dual Wavelength Pulse Generation Using Mode–Locked Erbium–Doped Fibre Ring Laser", J. Schlager et al, *Electronics Letters*, 24 Oct. 1991, vol. 27, No. 22, pp. 2072–2073.

"All Optical FM Mode–Locking of Fibre Laser", E. Greer et al, *Electronics Letters*, 27 Aug. 1992, vol. 28, No. 18, pp. 1741–1743.

*Primary Examiner*—Leon Scott, Jr.
*Attorney, Agent, or Firm*—Ware, Fressola, Van Der Sluys & Adolphson

[57] ABSTRACT

An optically pumped bistable laser (LAS) with an active laser condition and an excited inactive condition is presented. The bistable laser (LAS) comprises an erbium-doped fiber (ER), a resonator (RES), a pumping light source (PUMP), and optical isolator (ISO), a wavelength-dependent coupler (WDM) and an asymmetrical fiber coupler (FC). Excitation from the excited condition is created by pumping light from the pumping light source (PUMP) into the erbium-doped fiber (ER), to place the bistable laser into the excited inactive condition. Optical pulses, which are coupled in through input (IN), activate the bistable laser (LAS) and enable it to operate both as a pulse generator and a trigger circuit, as a function of pulse duration and/or pulse frequency.

8 Claims, 1 Drawing Sheet

OPTICALLY PUMPED BISTABLE LASER

TECHNICAL FIELD

The invention concerns an optically pumped laser that is driven by optical pulses.

BACKGROUND OF THE INVENTION

The article "All-Optical FM mode-locking of fiber laser" from the Electronic Letters of Aug. 1992, pages 1741–1743 by E. J. Greer and K. Smith, describes a fiber laser for producing optical pulses. The fiber laser is configured as a ring laser with an erbium-doped fiber, an optical filter, a fiber modulator and several couplers. The fiber modulator is driven by optical pulses. The optical pulses briefly change the index of refraction of the fiber modulator, changing the phase of the continuous radiation (CW-operation) produced in the erbium-doped fiber. This leads to interference and thus to the generation of optical pulses at the laser output. To obtain sufficient modulation effect, i.e. a sufficiently large phase shift, it is necessary to construct the fiber modulator from an 8.8 km long fiber, which can negatively influence the operation of the fiber laser, e.g. due to production tolerances. This fiber laser is particularly sensitive to temperature because of the 8.8 km long fiber.

DISCLOSURE OF INVENTION

It is therefore a task of the invention to make available a technically simpler optically pumped laser that is driven by optical pulses.

According to the invention, an optically pumped bistable laser is shown having an active laser medium, with a resonator, with a pumping light source, whose pumped light can bring the active laser medium into an excited inactive laser condition, and with a coupling device for coupling a signal light, whereby said active laser medium in an excited inactive laser condition can be brought into an active laser condition.

According further to the invention, the active laser medium is a fiber doped with an element from the rare earths group, and the resonator is a fiber resonator.

According still further to the invention, the resonator is a ring resonator.

In further accord with the invention, the bistable laser contains one or more optical isolators.

Further in accord with the invention, the pumping light source is a light source for light in a wavelength range of 780 nm to 850 nm.

Still further in accord with the invention, the pumping light source contains two lasers with different wavelength emissions, and the wavelengths of the different wavelength emissions are shorter than a wavelength of the signal light.

In accordance still further with to the invention, a length of the resonator is such, that with a pulsed signal light a basic pulse frequency corresponds to an integral multiple of a reciprocal value of a time during which light passes through the resonator.

In further accord with the invention, a resonator length is such, that with an optical pulse as the signal light, the pulse duration of the optical pulse corresponds at least to the time during which the light passes through the resonator.

According further to the invention, a method is shown for using said optically pumped bistable laser as a pulse generator comprising the steps of providing said signal light as said pulsed signal light and passing said light through said resonator at said frequency for said time.

According still further to the invention, a method is shown for using said optically pumped bistable laser for recovering a pulse.

Still further according to the invention, a method is shown for using said optically pumped bistable laser as a trigger circuit.

A special advantage of the invention lies in the possibility of also using the bistable laser as a trigger circuit, in addition to generating optical pulses.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
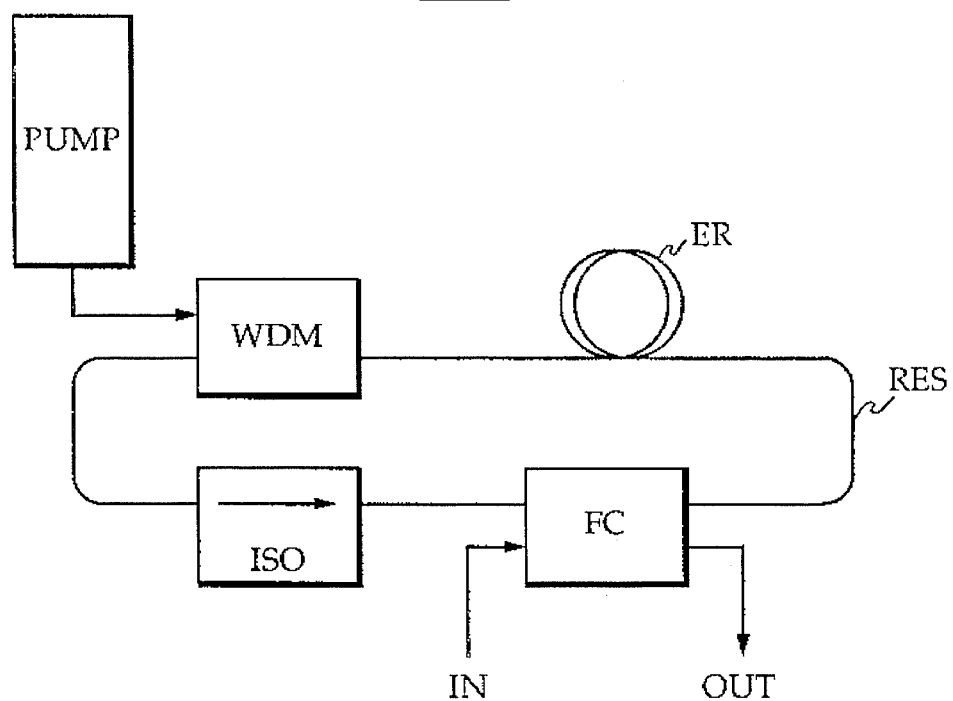
FIG. 1 is a schematic illustration of a configuration example of a bistable laser according to the invention.

A configuration example of the invention will now be described by means of FIGS. 1 and 2. FIG. 1 illustrates the schematic arrangement of a configuration example of the bistable laser according to the invention. The bistable laser LAS contains an erbium-doped fiber ER as the active laser medium, a fiber resonator as resonator, and a pumping light source PUMP as the energy source. The bistable laser LAS further contains an optical isolator ISO, which may be a Faraday isolator, a wavelength-dependent coupler WDM and an asymmetrical fiber coupler FC.

The fiber resonator is configured as a ring resonator RES. The erbium-doped fiber ER, the asymmetrical fiber coupler FC, the optical isolator ISO and the wavelength-dependent coupler WDM are connected in series with the ring resonator RES.

The wavelength-dependent coupler WDM has three connections. Two connections serve to connect it to the ring resonator RES. The third connection is connected to the pumping light source PUMP. The pumping light source PUMP generates pumped light, which is coupled to the ring resonator through the wavelength-dependent coupler WDM. The pumped light has a shorter wavelength than the signal light. Thus, the wavelength-dependent coupler WDM couples light from two fibers with different wavelengths into one fiber.

The optical isolator ISO allows light to pass nearly loss-free in one direction only, as indicated by a directional arrow; in the other direction the light attenuation is more than 30 dB. Among other things, the optical isolator ISO serves to establish a direction of circulation for the signal light. It has two connections and is connected to the ring resonator RES in such a way, that its passage direction is equal to the desired direction of circulation of the signal light.

The asymmetrical fiber coupler FC has four connections. Two connections are used to connect it to the ring resonator RES. The third connection forms the input IN to the bistable laser LAS, the fourth connection forms the output OUT of the bistable laser LAS. Signal light is asymmetrically coupled into and out of the ring resonator RES through the input IN and output OUT, respectively. For example, 20% of the signal light is coupled out of ring resonator RES and is available for the bistable laser LAS at output OUT, while the remaining 80% of the signal light stays in the ring resonator RES and maintains the operation of the bistable laser LAS.

The pumping light source PUMP generates pumped light at the 800 nm wavelength. This pumped light excites an excited inactive condition of the erbium-doped fiber ER, which is depicted in greater detail in FIG. 2. In the pumped condition and in the absence of optical signals at input IN, the bistable laser LAS is in an excited inactive condition, i.e. it does not emit any light. Applying signal light to the input IN causes the bistable laser LAS to change into the active laser condition. The signal light can consist of optical pulses, for example. The bistable laser LAS can be operated in several different conditions by selecting the duration and the frequency of the optical pulses of a pulse-shaped signal light. Two modes of operation and three possibilities of usage of the optical message transmission are described in the following for the bistable laser LAS.

In the first mode of operation, the bistable laser LAS is driven through the input IN in such a way, that it operates in the pulse operation. To that effect, periodic optical pulses are coupled into the ring resonator RES through input IN. The frequency of the optical pulses corresponds to an integral multiple of the circulation frequency f of the light in ring resonator RES. The circulation frequency f is determined by f=c/(L·n), where c=the speed of light in a vacuum in meters per second, L=the resonator length, which includes the length of the ER and the other components of the ring (in meters) and where n=the index of refraction. For example, a circulation frequency f=6.67 MHz results when L=30 m and n=1.5. The coupled optical pulses induce stimulated emissions in the erbium-doped fiber ER, which is in the excited inactive condition, creating an amplification of the optical pulses. Thus, amplified optical pulses, as compared to the input pulses, are now available at the output OUT of the bistable laser LAS. The frequency of the output pulses equals the frequency of the input pulses. In this mode of operation, the bistable laser LAS can be used as a pulse generator, for example. Optical pulses, which e.g. were transmitted through a telecommunications network, can be prepared and amplified in the bistable laser LAS, and are available as pulse signals at the output of the bistable laser LAS, for example for pulse recovery during the optical signal processing. The optical pulses are e.g. a sequence of bit signals (0 or 1) modulated on a basic pulse, which contains message information. The basic pulse frequency corresponds to an integral multiple of the circulation frequency f of the light in ring resonator RES. The sequence of bit signals passes through the ring resonator RES. Each 1 produces a stimulated emission in the erbium-doped fiber ER. Because of the nearly statistical distribution of the logical conditions 1 and 0, the basic pulse can therefore be filtered out of the sequence of bit signals after a certain time, and is available at the output as a pulse signal for the optical signal processing.

In the second mode of operation, the bistable laser LAS is driven from input IN in such a way, that it functions in CW-operation (emission of continuous radiation). To that effect, an optical pulse is coupled from input IN into the ring resonator RES. The duration of the optical pulse must at least correspond to the circulation time (1/f) of the light in ring resonator RES. It must be ensured that the optical pulse induces sufficient stimulated emissions in the erbium-doped fiber ER, so that the stimulated emissions are able to maintain the CW-operation. In this mode of operation, the bistable laser LAS can then be used e.g. as a trigger circuit. With the one-time coupling of an optical pulse, the bistable laser LAS changes from the excited inactive condition into the active laser condition of the CW-operation. Resetting the bistable laser LAS into the excited inactive condition can be achieved e.g. by briefly turning off the pumping light.

In the configuration example, the fiber resonator RES is configured as a ring resonator RES. The invention can also be used with a different resonator than the ring resonator RES, e.g. with a Fabry-Perot resonator. In addition, the fiber resonator RES and the entire bistable laser LAS as well can be configured as a monolithically integrated circuit. In that case e.g. quartz glass $SiO_2$ or "lithium-niobath" $LiNbO_3$ can serve as the active laser medium.

Furthermore, for reasons of stability the fibers used in the configuration example are preferably polarization-retaining single-mode fibers.

In the configuration example, an asymmetrical fiber coupler FC is used for coupling light in as well as out. Instead of an asymmetrical fiber coupler FC, two separate asymmetrical fiber couplers can be used, one to couple light in, and the other to couple light out. The two separate asymmetrical fiber couplers are then connected to the ring resonator RES in such a way, that first the asymmetrical fiber coupler for coupling light out, and then the asymmetrical fiber coupler for coupling light in, are connected in the running direction of the signal light. This has the advantage of suppressing most cross-talk from the input signals to the output signals.

Figure 2:
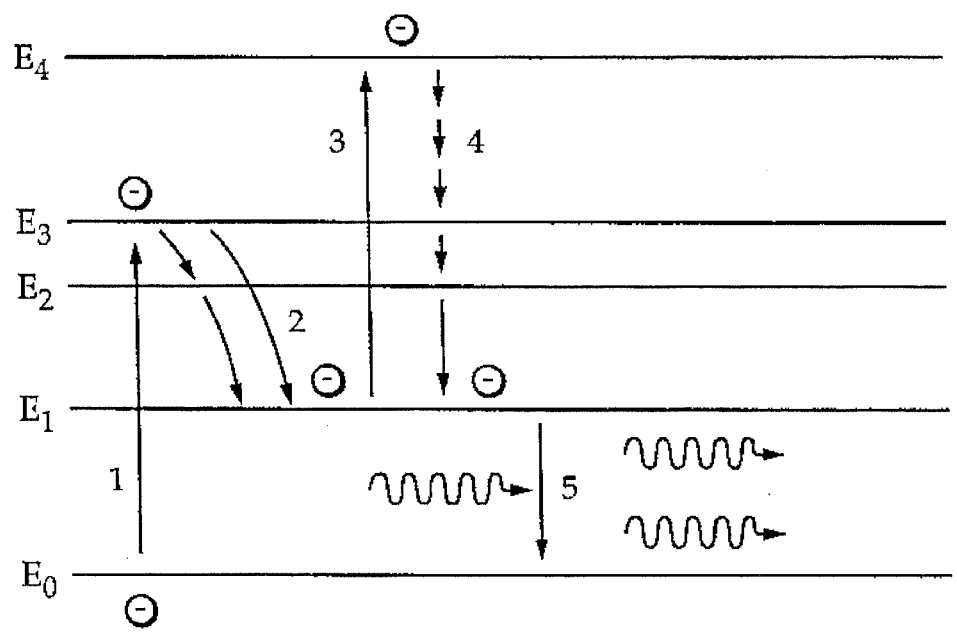
FIG. 2 is an energy level diagram of the erbium-doped fiber of a bistable laser according to the invention.

FIG. 2 depicts the five energy levels $E_0$, $E_1$, $E_2$, $E_3$, $E_4$ that are needed to understand the invention, as well as five transitions 1, 2, 3, 4, 5 between the energy levels $E_0$, $E_1$, $E_2$, $E_3$, $E_4$ of the erbium-doped fiber of the bistable laser of the invention.

Electrons can be excited from the basic condition, i.e. energy level $E_0$, to energy levels $E_2$ and $E_3$ with pumped light at the following wavelengths: to energy level $E_2$ with pumped light at 980 nm, to energy level $E_3$ with pumped light at 800 nm. Energy level $E_1$ lies between energy levels $E_0$ and $E_2$. On the one hand, electrons at the $E_1$ energy level can be excited to stimulated emissions with light at wavelengths 1530 nm to 1570 nm, and on the other from energy level $E_1$ to energy level $E_4$ by pumped light at 800 nm wavelength (excitation from the excited condition).

In the configuration example, the erbium-doped fiber receives pumped light at the 800 nm wavelength. The result is that electrons are excited from the basic condition, i.e. from energy level $E_0$, to energy level $E_3$ (transition 1). The service life of the electrons in energy levels $E_3$ and $E_2$ is short when compared to the service life of electrons in energy level $E_1$. Electrons excited to energy level $E_3$ pass through non-radiating transitions into energy level $E_1$ (transition 2), possibly through energy level $E_2$. The pumped light at the 800 nm wavelength further causes electrons that have been excited to energy level $E_1$ to be excited to energy level $E_4$ (transition 3) (excitation from the excited condition). Electrons that have been excited to energy level $E_4$ pass through non-radiating transitions into energy level $E_1$ (transition 4), possibly through several energy levels. The processes of exciting electrons from energy level $E_1$ to energy level $E_4$ (transition 3) and the non-radiating transitions of electrons from energy level $E_4$ to energy level $E_1$ (transition 4) are now continuously repeated, so that the bistable laser remains in the excited inactive condition. The process of stimulated emission (transition 5) only takes place by radiating light at wavelengths of 1530 nm to 1570 nm, which corresponds to the transition from energy level $E_1$ to energy level $E_0$. The processes of stimulated emission (transition 5) and the excitation from the excited condition (transition 3) are in competition with each other. The more signal light is radiated into the erbium-doped fiber, the less excitation from the excited condition (transition 3) takes place. The bistable laser then passes into the active laser condition.

The erbium-doped fiber in the configuration example receives pumped light at one wavelength (800 nm). The invention can also be used with pumped light at two wavelengths, e.g. 800 nm and 980 nm. The pumping light source PUMP then contains two lasers and one wavelength-dependent coupler. One of the lasers is used to generate 800 nm pumped light, and the other to generate 980 nm pumped light. The wavelength-dependent coupler couples the 800 nm pumped light and the 980 nm pumped light into a fiber, so that pumped light from two wavelengths can be coupled into the resonator RES of the bistable laser LAS through one fiber. The pumped light at the 980 nm wavelength can be used to excite electrons from energy level $E_0$ to energy level $E_2$ (and thereby to energy level $E_1$), and the pumped light at the 800 nm wavelength can be used to excite from the excited condition (transition 3). The excitation of electrons from energy level $E_0$ to energy level $E_1$ is more effective with 980 nm pumped light than with 800 nm pumped light. Therefore, the use of pumped light at two wavelengths makes a higher output of the bistable laser LAS possible.

The absolute wavelength values are only examples. Thus, e.g. light in the wavelength range of 780 nm to 850 nm can be used to produce excitation from the excited condition (transition 3).

The configuration example describes a bistable laser LAS with an erbium-doped fiber as the active laser medium. Instead of the erbium-doped fiber, one doped with another element from the rare earths group can be used as the active laser medium.

Furthermore, the configuration example only mentions the parts and units of the bistable laser LAS that are needed to understand the invention. Other parts and units, such as e.g. additional optical isolators, polarizers, optical filters, optical attenuators or synchronization devices, whose use, arrangement, advantages or even necessity are known to the expert from the publication Electronic Letters, 24th. Oct. 1991, Vol. 27, no. 22, have not been addressed in the description.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Optically pumped bistable laser having a pumping light source and a resonator, the resonator comprising an active laser medium connected to the pumping light source, the pumping light source for providing pumping light to bring the active laser medium into an excited inactive laser condition and to maintain that condition, the active laser medium further connected to an asymmetrically coupling device (FC) for coupling a signal light into the laser medium, whereby said active laser medium in an excited inactive laser condition is brought into an active laser condition when the signal light is coupled into the laser medium and whereby the active laser condition is sustained after the signal light is removed.

2. Optically pumped bistable laser as claimed in claim 1, wherein the active laser medium is a fiber doped with an element from the rare earths group, and the resonator is a fiber resonator.

3. Optically pumped bistable laser as claimed in claim 1, wherein the resonator is a ring resonator.

4. Optically pumped bistable laser as claimed in claim 1, wherein the bistable laser contains one or more optical isolators inserted along the resonator.

5. Optically pumped bistable laser as claimed in claim 1, wherein the pumping light source is a light source for light in a wavelength range of 780 nm to 850 nm.

6. Optically pumped bistable laser as claimed in claim 1, wherein the pumping light source contains two lasers with different wavelength emissions having wavelengths that are shorter than a wavelength of the signal light.

7. Optically pumped bistable laser as claimed in claim 1, wherein a length of the resonator is such that with a pulsed signal light a basic pulse frequency corresponds to an integral multiple of a reciprocal value of a time it takes light to pass through the resonator.

8. Optically pumped bistable laser as claimed in claim 1, wherein the resonator is of a length such that, with an optical pulse as the signal light, the optical pulse lasts longer than it takes the optical pulse to pass through the resonator.

* * * * *